United States Patent
Hu (10) Patent No.: US 11,643,566 B2
(45) Date of Patent: May 9, 2023

(54) PARTICULATE COMPOSITIONS COMPRISING A METAL PRECURSOR FOR ADDITIVE MANUFACTURING AND METHODS ASSOCIATED THEREWITH

(71) Applicant: Xerox Corporation, Norwalk, CT (US)

(72) Inventor: Nan-Xing Hu, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 200 days.

(21) Appl. No.: 16/916,460

(22) Filed: Jun. 30, 2020

(65) Prior Publication Data

US 2021/0071020 A1    Mar. 11, 2021

Related U.S. Application Data

(60) Provisional application No. 62/897,534, filed on Sep. 9, 2019.

(51) Int. Cl.
*C09D 11/322* (2014.01)
*B33Y 10/00* (2015.01)
(Continued)

(52) U.S. Cl.
CPC .......... *C09D 11/322* (2013.01); *B29C 64/153* (2017.08); *B29C 64/188* (2017.08);
(Continued)

(58) Field of Classification Search
CPC ....... B29C 64/188; B29C 64/153; B22F 1/10; B22F 1/054; B22F 1/25; B33Y 10/00; B33Y 40/20; B33Y 70/10; B33Y 50/02
See application file for complete search history.

(56) References Cited

U.S. PATENT DOCUMENTS 4,863,646 A   9/1989  Watanabe et al.
5,859,075 A   1/1999  Shukla et al.
(Continued)

FOREIGN PATENT DOCUMENTS

CA      2874759 A1    6/2015
CN    104 194 326 A  12/2014
(Continued)

OTHER PUBLICATIONS

EP search report for related matter EP20194473.3 dated Feb. 22, 2021.
(Continued)

*Primary Examiner* — Nahida Sultana
(74) *Attorney, Agent, or Firm* — Vorys, Sater, Seymour and Pease LLP (57) ABSTRACT

Additive manufacturing processes, such as powder bed fusion of thermoplastic particulates, may be employed to form printed objects in a range of shapes. It is sometimes desirable to form conductive traces upon the surface of printed objects. Conductive traces and similar features may be introduced during additive manufacturing processes by incorporating a metal precursor in a thermoplastic printing composition, converting a portion of the metal precursor to discontinuous metal islands using laser irradiation, and performing electroless plating. Suitable printing compositions may comprise a plurality of thermoplastic particulates comprising a thermoplastic polymer, a metal precursor admixed with the thermoplastic polymer, and optionally a plurality of nanoparticles disposed upon an outer surface of each of the thermoplastic particulates, wherein the metal precursor is activatable to form metal islands upon exposure to laser irradiation. Melt emulsification may be used to form the thermoplastic particulates.

11 Claims, 3 Drawing Sheets

(51) Int. Cl.
| | |
|---|---|
| B29C 64/153 | (2017.01) |
| B29C 64/188 | (2017.01) |
| B33Y 40/20 | (2020.01) |
| B33Y 70/10 | (2020.01) |
| C09D 11/037 | (2014.01) |
| C09D 11/38 | (2014.01) |
| C23C 18/16 | (2006.01) |
| B29K 101/12 | (2006.01) |

(52) U.S. Cl.
CPC .............. *B33Y 10/00* (2014.12); *B33Y 40/20* (2020.01); *B33Y 70/10* (2020.01); *C09D 11/037* (2013.01); *C09D 11/38* (2013.01); *C23C 18/1603* (2013.01); *B29K 2101/12* (2013.01)

(56) References Cited

U.S. PATENT DOCUMENTS

| | | | |
|---|---|---|---|
| 5,990,290 | A | 11/1999 | Phillips |
| 7,740,938 | B2 | 6/2010 | Helft et al. |
| 8,822,555 | B2 | 9/2014 | Kaiso et al. |
| 10,655,025 | B2 | 5/2020 | Farrugia et al. |
| 2006/0189113 | A1* | 8/2006 | Vanheusden ............. C22B 3/20 257/E21.174 |
| 2011/0229545 | A1 | 9/2011 | Shum et al. |
| 2014/0231266 | A1 | 8/2014 | Sherrer et al. |
| 2015/0152214 | A1 | 6/2015 | Uenlue |
| 2017/0129177 | A1 | 5/2017 | Hättig et al. |
| 2019/0255612 | A1* | 8/2019 | Mark ..................... F27D 19/00 |
| 2020/0095389 | A1* | 3/2020 | Gosselin ................ C12N 11/14 |
| 2021/0122886 | A1* | 4/2021 | Naruhashi ................ C08J 3/20 |
| 2021/0347112 | A1* | 11/2021 | Su ......................... B29C 64/153 |
| 2022/0025210 | A1* | 1/2022 | Dippel .................... C09D 7/70 |

FOREIGN PATENT DOCUMENTS

| | | |
|---|---|---|
| DE | 10 2017 102137 A1 | 8/2015 |
| EP | 0 866 088 A | 9/1998 |
| EP | 2 098 574 A1 | 9/2009 |
| EP | 2639262 A1 | 9/2013 |
| FR | 2 939 075 A1 | 6/2010 |
| JP | 2002080629 A | 3/2002 |
| JP | 2006321711 A | 11/2006 |
| WO | 1999067224 A1 | 12/1999 |
| WO | 2015/109143 A | 7/2015 |
| WO | 2018/141631 A1 | 8/2018 |
| WO | 2019073030 A1 | 4/2019 |

OTHER PUBLICATIONS

Niino Toshiki et al; "Development of LS-LDS combined process and material enabling simultaneous . . . " 2018 13th Int'l Congress Molded Interconnect Deviced, IEEE, Sep. 25, 2018, pp. 1-4.

Gath Christian et al; "Circuit board application to additive manufactured components by laser-direct structuring;" 2016; 12th Int'l Congress Molded Interconnect Deviced, IEEE, Sep. 28, 2016, pp. 1-6.

Sebastien Simon et al; "Rheological Properties of Particle-Stabilized Emulsions;" Journal of Science and Technology; vol. 31, No. 5, Jan. 1, 2010, pp. 632-640.

EP search report for related matter EP20194471.7 dated Feb. 15, 2021.

H. Patil, et al. Hot-melt extrusion: from theory to application in pharmaceutical applicaitons, AAPS PharmSciTech, vol. 17, No. 1, pp. 20-42, Feb. 2016.

U. Sundararaj, et al. Drop breakup and coalescence in polymer blends: the effects of concentration and compatibilization. Macromolecules 1995, 28, 2647-2657.

R G Kleijnen, et al., Production and Processing of a Spherical Polybutylene Terephthalate Powder for Laser Sintering, Appl. Sci. 2019, 9(7), 1308.

I. Pillin, et al. Crystallization kinetics of poly(butylene terephthalate) (PBT): Influence of additives and free carboxylic acid chain ends. Polym. Eng. Sci 2001, 41, 178-191.

S Fanselow, et al. AIP Conference Proceedings 1713, 140007 (2016)—Production of micron-sized polymer particles for additive manufacturing by melt emulsification.

M Schmid, et al., AIP Conference Proceedings 1664, 160009 (2015)—Polymer powders for selective laser sintering (SLS).

M Schmid, et al., Additive Manufacturing: Polymers Applicable for Laser Sintering (LS), Procedia Engineering 149 (2016) 457-464.

Office Action for corresponding Canadian application No. 3,091,723, dated Nov. 16, 2021.

\* cited by examiner

PARTICULATE COMPOSITIONS COMPRISING A METAL PRECURSOR FOR ADDITIVE MANUFACTURING AND METHODS ASSOCIATED THEREWITH

CROSS-REFERENCE TO RELATED APPLICATIONS

The present application claims the benefit of priority under 35 U.S.C. § 119 from U.S. Provisional Patent Application 62/897,534, filed on Sep. 9, 2019 and incorporated herein by reference in its entirety.

FIELD

The present disclosure generally relates to additive manufacturing, more particularly additive manufacturing processes employing powder bed fusion (PBF), such those employing selective laser sintering for producing complex objects and particulate compositions useful therein, wherein a metal precursor activatable by laser irradiation, such as laser irradiation delivered from a pulsed laser, is incorporated during a printing process.

BACKGROUND

Additive manufacturing, also known as three-dimensional (3-D) printing, is a rapidly growing technology area. Although additive manufacturing has traditionally been used for rapid prototyping activities, this technique is being increasingly employed for producing commercial and industrial parts (printed objects) in any number of complex shapes. Additive manufacturing processes operate by layer-by-layer deposition of either 1) a stream of molten printing material or a liquid precursor to a printing material or 2) powder particulates of a printing material. The layer-by-layer deposition usually takes place under control of a computer to deposit and consolidate the printing material in precise locations based upon a digital three-dimensional "blueprint" (a computer-aided design model) of the part to be manufactured. In a particular example, consolidation of powder particulates may take place in a powder bed deposited layer-by-layer using a three-dimensional printing system that employs a laser or electron beam to heat precise locations of the powder bed, thereby consolidating specified powder particulates to form a part having a desired shape. Fusion of powder particulates in a powder bed may take place by selective laser sintering (SLS), which employs a laser to promote consolidation of powder particulates via localized heating.

Among the powder particulates usable in three-dimensional printing are those comprising thermoplastic polymers. Although a wide array of thermoplastic polymers are known, there are relatively few having properties compatible for use in current three-dimensional printing techniques, particularly when performing particulate consolidation by selective laser sintering. Thermoplastic polymers suitable for consolidation by selective laser sintering include those having a significant difference between the onset of melting and the onset of crystallization, which may promote good structural and mechanical integrity.

In some instances, it can be desirable to form conductive traces upon the surface of an additively manufactured part. Currently, such conductive traces are formed through a separate inkjet printing, aerosol jet, or direct writing process to deposit an ink that is infused with a conductive material, such as graphite or metal, upon the surface of the part, followed by curing or sintering to promote formation of an electrically conductive pathway. Deposition of such conductive inks occurs under completely different conditions than does the additive manufacturing process, thereby requiring transfer of the printed part between production lines. This process can be cumbersome and time consuming in many cases, particularly when extreme accuracy is needed for placement of the conductive traces. Accurate placement of conductive traces upon a curved (non-flat) surface of the printed object may be especially problematic when forming conductive traces in this manner. Further difficulties may arise due to poor adhesion between particular thermoplastic polymers and conductive inks used in conjunction with inkjet and aerosol jet printing processes.

SUMMARY

The present disclosure provides particulate compositions suitable for additive manufacturing. The particulate compositions comprise: a plurality of thermoplastic particulates comprising a thermoplastic polymer and a metal precursor admixed with the thermoplastic polymer, the metal precursor being activatable to form metal islands upon exposure to laser irradiation. Optionally, the thermoplastic particulates may comprise a plurality of nanoparticles disposed upon an outer surface of each of the plurality of thermoplastic particulates.

The present disclosure also provides printed objects formed using the particulate compositions. The printed objects comprise: a polymer matrix formed by particulate consolidation and comprising a thermoplastic polymer; and a metal precursor admixed with the polymer matrix, the metal precursor being activatable to form metal islands upon exposure to laser irradiation. Optionally, a plurality of nanoparticles may be admixed with the polymer matrix in the printed object.

The present disclosure also provides methods for forming printed objects by powder bed fusion, such as through selective laser sintering. The methods comprise: depositing in a powder bed a particulate composition comprising a plurality of thermoplastic particulates comprising a thermoplastic polymer and a metal precursor admixed with the thermoplastic polymer, the metal precursor being activatable to form metal islands upon exposure to laser irradiation; and consolidating a portion of the plurality of thermoplastic particulates in the powder bed to form a printed object in which the metal precursor remains substantially unconverted to metal. Optionally, the plurality of thermoplastic particulates further comprises a plurality of nanoparticles disposed upon an outer surface of each of the plurality of thermoplastic particulates.

The present disclosure also provides methods for forming particulate compositions suitable for additive manufacturing. The methods comprise: combining a thermoplastic polymer and a metal precursor in a carrier fluid at a heating temperature at or above a melting point or softening temperature of the thermoplastic polymer; wherein the thermoplastic polymer and the carrier fluid are substantially immiscible at the heating temperature, and the metal precursor is activatable to form metal islands upon exposure to laser irradiation; applying sufficient shear to disperse the thermoplastic polymer as liquefied droplets in the presence of the metal precursor at the heating temperature; after liquefied droplets have formed, cooling the carrier fluid to at least a temperature at which thermoplastic particulates in a solidified state form, the thermoplastic particulates comprising the thermoplastic polymer and at least a portion of the metal precursor admixed with the thermoplastic polymer; and separating the thermoplastic particulates from the carrier fluid. Optionally, nanoparticles may be combined with the thermoplastic polymer and the metal precursor in the carrier fluid, such that at least a portion of the nanoparticles are disposed upon an outer surface of each of the thermoplastic particulates.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

The present disclosure generally relates to additive manufacturing, more particularly additive manufacturing methods employing particulate consolidation for producing printed objects, such as selective laser sintering and other powder bed fusion processes, wherein a metal precursor activatable by laser irradiation, such as provided by a pulsed laser, is present during the printing process, but which remains substantially unactivated during particulate consolidation.

As discussed above, additive manufacturing processes, such as those employing selective laser sintering and other powder bed fusion processes to promote particulate consolidation, are capable of producing parts in a wide range of complex shapes. At present, it is not feasible to introduce conductive traces upon the surface of printed parts as an integral portion of the additive manufacturing process. Instead, a separate aerosol, inkjet or direct printing technique is employed to deposit conductive inks upon the surface of a printed object (part), with subsequent curing or sintering being conducted to promote electrical conductivity. The separate printing technique to deposit the conductive inks may limit processing throughput and lead to inaccurate placement of the conductive traces. In some instances, there may also be poor adhesion between a thermoplastic polymer comprising the printed object and the conductive ink used to deposit the conductive traces.

Advantageously, the present disclosure provides a route whereby metal islands may be introduced during additive manufacturing processes, such as those employing selective laser sintering and other powder bed fusion processes, without necessarily transferring the part to a separate printing production line following part manufacture. In particular, the present disclosure employs particulate compositions comprising a metal precursor that is activatable by laser irradiation, particularly with a pulsed laser, to promote formation of discontinuous metal islands upon the surface of an object formed by additive manufacturing. Suitable metal precursors are non-conductive prior to activation and comprise a metal in a coordinated state and/or in a salt form. Following activation, the metal precursor may be converted into a metallic conductor. In some embodiments, the laser used for promoting selective laser sintering may also be used to promote formation of metal islands under processing conditions distinct from those used for performing particulate consolidation. Alternately, a separate laser may be used for promoting particulate consolidation and for activating a metal precursor to form metal islands. That is, the processes disclosed herein may employ two lasers: a first laser, such as a continuous laser, effective to promote consolidation of powder particulates but without activating the metal precursor and a second laser, such as a pulsed laser, effective to promote formation of metal (metal islands) once particulate consolidation has been completed. Incorporation of a second laser within equipment for performing selective laser sintering and other powder bed fusion processes may be readily accomplished, thereby allowing metal islands to be formed without moving a printed object following fabrication thereof. Alternately, the second laser used for promoting formation of metal islands may be in a different location from the first laser used for conducting selective laser sintering. Since the position of the printed object remains fixed following fabrication and is known with high accuracy during selective laser sintering and other powder bed fusion processes, metal islands may also be accurately placed thereon through use of the disclosure herein. It is to be appreciated, however, that metal island formation may alternately be conducted using a second laser in a separate system differing from that used for performing powder bed fusion.

A wide range of metal precursors may be employed in the disclosure herein and are discussed in further detail below. Advantageously, such metal precursors may be readily incorporated within powder particulates that are used in conjunction with selective laser sintering processes and other powder bed fusion processes. Such powder particulates may be formed from thermoplastic polymers containing a metal precursor, such as through conventional mechanical grinding or precipitation processes. More desirably, however, metal precursors may become admixed with thermoplastic polymers during melt emulsification processes, including those employing extrusion processing of a melt emulsion, used to form thermoplastic particulates as a powder composition, as described in further detail herein. Particularly suitable melt emulsification processes may incorporate nanoparticles, such as carbon black, and/or silica nanoparticles or other oxide nanoparticles, in the particulate formation process as an emulsion stabilizer, wherein the nanoparticles become disposed upon the outer surface of thermoplastic particulates resulting from solidification of liquefied thermoplastic polymer droplets. The coating or partial coating of nanoparticles upon the outer surface results in a narrow size particle distribution and high sphericity for the thermoplastic particulates, which may afford good flow properties and ready particulate consolidation during additive manufacturing. Metal precursors do not interfere with the particulate formation process, nor do the nanoparticles interfere with the formation of metal islands following particulate consolidation.

Terms used in the description and claims herein have their plain and ordinary meaning, except as modified by the paragraphs below.

As used herein, the term "immiscible" refers to a mixture of components that, when combined, form two or more phases that have less than 5 wt. % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt. % solubility in each other at 65° C.

As used herein, the term "thermoplastic polymer" refers to a polymer material that softens and hardens reversibly on heating and cooling. Thermoplastic polymers encompass thermoplastic elastomers.

As used herein, the term "nanoparticles" refers to a particulate material having a particle size ranging from about 1 nm to about 500 nm.

As used herein, the term "oxide" refers to both metal oxides and non-metal oxides. For purposes of the present disclosure, silicon is considered to be a metal.

As used herein, the term "oxide nanoparticles" refers to a particulate material having a particle size ranging from about 1 nm to about 500 nm and comprising a metal oxide or a non-metal oxide.

As used herein, the term "associated" refers to chemical bonding or physical adherence to a surface, particularly an emulsion stabilizer comprising nanoparticles. Without being limited by theory, it is believed that the associations described herein between polymers and emulsion stabilizers are primarily physical adherence via hydrogen bonding and/or other mechanisms. However, chemical bonding may be occurring to some degree.

As used herein, the term "admixed" refers to dissolution of a first substance in a second substance or dispersion of a first substance as a solid in a second substance, wherein the dispersion may be uniform or non-uniform. In various embodiments, the metal precursor may be substantially uniformly dispersed throughout the interior of the thermoplastic particulates disclosed herein.

As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. D50 may also be referred to as the "average particle size." As used herein, the term "D90" refers to a diameter at which 90% of the sample (on a volume basis unless otherwise specified) is comprised of particles having a diameter less than said diameter value.

As used herein, the term "shear" refers to stirring or a similar process that induces mechanical agitation in a fluid.

As used herein, the term "embed" relative to nanoparticles and a surface of a polymer particle refers to the nanoparticle being at least partially extended into the surface such that polymer is in contact with the nanoparticle to a greater degree than would occur if the nanoparticle were simply laid on the surface of the polymer particle, thereby contacting the surface tangentially.

As used herein, the viscosity of carrier fluids refer to the kinematic viscosity at 25° C., unless otherwise specified, and are measured per ASTM D445-19, unless otherwise specified.

The melting point of a thermoplastic polymer, unless otherwise specified, is determined by ASTM E794-06(2018) with 10° C./min ramping and cooling rates.

The softening temperature or softening point of a thermoplastic polymer, unless otherwise specified, is determined by ASTM D6090-17. The softening temperature can be measured by using a cup and ball apparatus available from Mettler-Toledo using a 0.50 gram sample with a heating rate of 1° C./min.

As used herein, the term "near-infrared" region refers to a wavelength range of about 700 nm to about 1400 nm, which is sometimes referred to as the IR-A region (as specified by the International Commission on Illumination).

Particulate compositions of the present disclosure comprise thermoplastic particulates and may be suitable for use in additive manufacturing processes, particularly additive manufacturing processes employing selective laser sintering to promote particulate consolidation and a pulsed laser to promote formation of metal from a metal precursor. Particulate compositions suitable for additive manufacturing may exhibit good flow properties for dispensation in a powder bed using a print head or similar device. Flow aids and modifications upon the thermoplastic particulates may facilitate the dispensation process. Suitable thermoplastic particulates may also exhibit melting and crystallization temperatures compatible with a specified consolidation technique in a given additive manufacturing process. Particulate compositions of the present disclosure suitable for additive manufacturing may comprise a plurality of particulates comprising a thermoplastic polymer and a metal precursor admixed with the thermoplastic polymer, in which the metal precursor is activatable to form metal islands upon exposure to laser irradiation, particularly with a pulsed laser. More specific particulate compositions of the present disclosure suitable for additive manufacturing may comprise a plurality of particulates comprising a thermoplastic polymer, a metal precursor admixed with the thermoplastic polymer, and a plurality of nanoparticles disposed upon an outer surface of each of the plurality of thermoplastic particulates, in which the metal precursor is activatable to form metal upon exposure to laser irradiation, particularly with a pulsed laser. Optionally, at least some nanoparticles may be admixed with the thermoplastic polymer, such that a first portion of the nanoparticles are located within the thermoplastic particulates and a second portion of the nanoparticles are disposed upon the surface of the thermoplastic particulates. The nanoparticles disposed upon the outer surface of the thermoplastic particulates may be at least partially embedded in the outer surface and associated therewith. When present, nanoparticles disposed upon the outer surface of the thermoplastic particulates may promote ready dispensation of the particulate compositions during additive manufacturing.

When present, the plurality of nanoparticles may comprise a plurality of oxide nanoparticles. Oxide nanoparticles suitable for use in the present disclosure may include, for example, silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides such as aluminosilicates, borosilicates, and aluminoborosilicates, for example, are also encompassed by the term "oxide." The oxide nanoparticles may be hydrophilic or hydrophobic in nature, which may be native to the nanoparticles or result from surface treatment of the nanoparticles. For example, silica nanoparticles having a hydrophobic surface treatment, such as dimethylsilyl, trimethylsilyl, or the like, may be formed through reacting hydrophilic surface hydroxyl groups with an appropriate functionalizing agent. Hydrophobically functionalized oxide nanoparticles may be particularly desirable in the methods and particulate compositions of the present disclosure, although unfunctionalized oxide nanoparticles or hydrophilically modified oxide nanoparticles may also be suitable for use as well.

Silica nanoparticles, particularly fumed silica nanoparticles with a hydrophobic functionalization thereon, may be especially suitable for use in the disclosure herein, since a variety of functionalized silicas are available, with the type of hydrophobic functionalization and the particle size being varied. Silazane and silane hydrophobic functionalizations are facile hydrophobic functionalizations that may be used in the present disclosure. As such, the plurality of oxide nanoparticles used in the disclosure herein may comprise or consist essentially of silica nanoparticles, particularly silica nanoparticles that are hydrophobically functionalized. Silica nanoparticles may be used in combination with another type of oxide nanoparticle or non-oxide nanoparticle wherein the other type of oxide or non-oxide nanoparticle may convey properties to the thermoplastic particulates, or an object formed therefrom, that are not attained when using silica nanoparticles alone.

Carbon black is another type of nanoparticle that may be present upon thermoplastic particulates in the disclosure herein. Various grades of carbon black will be familiar to one having ordinary skill in the art, any of which may be used in the disclosure herein. Other nanoparticles capable of absorbing infrared radiation may be used similarly to facilitate thermoplastic particulate formation as well. Carbon black, silica, and other types of oxide nanoparticles may be present in combination with one another in some instances.

Polymer nanoparticles are another type of nanoparticle that may be present upon thermoplastic particulates suitable for use in the disclosure herein. Suitable polymer nanoparticles may include one or more polymers that are thermosetting and/or crosslinked, such that they do not melt when processed by melt emulsification or similar particulate formation technique according to the disclosure herein. Nanoparticles comprising high molecular weight thermoplastic polymers having high melting or decomposition points may similarly represent suitable polymers in the disclosure herein for facilitating thermoplastic particulate formation.

The loading and particle size of silica nanoparticles or similar oxide nanoparticles upon thermoplastic particulates may vary over a wide range in the disclosure herein. The loading of the silica nanoparticles or similar oxide nanoparticles may be determined by the nanoparticle concentration in a carrier fluid used to promote formation of the thermoplastic particulates, as described further below. In non-limiting examples, the concentration of nanoparticles in the carrier fluid may range from about 0.01 wt. % to about 10 wt. %, or about 0.05 wt. % to about 10 wt. %, or about 0.05 wt. % to about 5 wt. %, or about 0.1 wt. % to about 2 wt. %, or about 0.25 wt. % to about 1.5 wt. %, or about 0.2 wt. % to about 1.0 wt. %, or about 0.25 wt. % to about 1 wt. %, or about 0.25 wt. % to about 0.5 wt. % with respect to the weight of the thermoplastic polymer. The particle size of the nanoparticles may range from about 1 nm to about 100 nm, although particles sizes up to about 500 nm may also be acceptable. In non-limiting examples, the particle size of the nanoparticles may range from about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. The nanoparticles, particularly silica nanoparticles and similar oxide nanoparticles, may have a BET surface area of about 10 $m^2/g$ to about 500 $m^2/g$, or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$.

Particular silica nanoparticles suitable for use in the disclosure herein may be hydrophobically functionalized. Such hydrophobic functionalization may make the silica nanoparticles less compatible with water than unfunctionalized silica nanoparticles. In addition, the hydrophobic functionalization may improve dispersion of the silica nanoparticles in the carrier fluid, which may be highly hydrophobic. The hydrophobic functionalization may be non-covalently or covalently attached to a surface of the silica nanoparticles. Covalent attachment may take place, for example, through functionalization of surface hydroxyl groups on the surface of the silica nanoparticles. In a non-limiting example, silica nanoparticles may be treated with hexamethyldisilazane to afford covalent functionalization of a hydrophobic modification. Commercially available hydrophobically functionalized silica nanoparticles include, for example, Aerosil RX50 (Evonik, average particle size=40 nm) and Aerosil R812S (Evonik, average particle size=7 nm).

Suitable oxide or non-oxide nanoparticles for use in the disclosure herein may also include those that are capable of absorbing infrared radiation. Exemplary materials capable of absorbing infrared radiation to promote formation of metal from a metal precursor are discussed further below.

Metal precursors may be incorporated in the thermoplastic particulates during melt emulsification or another suitable blending technique in which the thermoplastic polymer is softened or liquefied to form thermoplastic polymer droplets. As such, suitable metal precursors may be thermally stable to a temperature greater than or equal to that of the melting point or softening temperature of the thermoplastic polymer. Other characteristics of suitable metal precursors may include, for example, electrical non-conductivity (before conversion to metal), good weatherability, ready admixing of metal precursor particles with the thermoplastic polymer and/or solubility of the metal precursor in the thermoplastic polymer, and low toxicity. When admixed as particles, the metal precursor particles may range from about 10 nm to about 1000 nm in size.

Especially suitable metal precursors may be activatable by a laser operating in the infrared region (including the near-infrared region), visible region, or ultraviolet region of the electromagnetic spectrum. Thus, suitable laser irradiation wavelengths may be selected from those residing within a range of about 200 nm to about 14,000 nm, particularly an irradiation wavelength ranging from about 1020 nm to about 1070 nm. Suitable lasers, particularly pulsed laser variants thereof, may include excimer lasers operating in the ultraviolet region of the electromagnetic spectrum, solid-state lasers, fiber lasers, semiconductor lasers (laser diodes), and $CO_2$ lasers (emission wavelength at 10,600 nm). When used for promoting metal precursor activation, $CO_2$ lasers may be operated under different conditions than when used for promoting consolidation of powder particulates. Specifically, a $CO_2$ laser may be operated at a laser intensity (laser power per unit area) when promoting metal activation that is higher than that used for promoting consolidation of powder particulates. As a result of the high laser intensities, pulsed wave operation of a laser may be desirable when activating a metal precursor.

Frequency-doubled or frequency-tripled Nd:YAG lasers or similar solid-state lasers may provide visible radiation (532 nm) or ultraviolet radiation (355 nm), whereas the non-multiplied variant may provide near-infrared radiation at 1064 nm. Other frequency-multiplied lasers may also be used in the disclosure herein.

The near-infrared region may be particularly suitable due to the ready availability of solid-state lasers or fiber lasers providing electromagnetic radiation in this region of the electromagnetic spectrum. For example, suitable lasers operating in the near-infrared region of the electromagnetic spectrum include, for example, Nd (neodymium)-doped solid-state lasers with an emission wavelength of about 1064 nm, such as Nd:YAG (yttrium aluminum garnet), Nd:YVO$_4$ (yttrium orthovanadate) and Nd:YLF (yttrium lithium fluoride) lasers; solid state lasers doped with other metals with an operating wavelength about 1020 nm to about 1050 nm; and fiber lasers, such as Yb-doped fiber lasers, with an emission about 1030 nm to about 1070 nm. Lasers suitable for use in the disclosure herein for activating a metal precursor may be operable in a pulsed wave mode to provide high pulse laser intensity for effectively converting a metal precursor into metal islands, as well as affording polymer surface ablation and roughening to promote strong metal adhesion. Particular examples of suitable metal precursors may include those that are activatable by a pulsed laser beam having an emission wavelength ranging from about 1020 nm to about 1070 nm, which resides in the near-infrared region of the electromagnetic spectrum. Such lasers may be operated at a power of about 1 W to about 10 W, a pulse frequency of about 10 kHz to about 120 kHz, and a scanning speed of about 0.1 m/s to about 10 m/s. The particular metal precursor used may dictate the type of pulsed laser used for forming metal islands and the emission wavelength thereof, as discussed for some particular examples hereinafter.

Particular examples of suitable metal precursors may include one or more of the following materials:

Copper oxide or a mixed oxide of copper and a metal selected from antimony, aluminum, cesium, cobalt, chromium, magnesium, manganese, nickel, tin, titanium, silver, iron, zinc, and zirconium. Particular examples of mixed oxides of copper include, for example, copper chromium oxide spinel (copper chromite), copper aluminum oxide, copper iron oxide, and the like. Copper chromite, for example, may be suitably activated at a pulsed laser emission wavelength of 1060 nm, such as with a Nd:YAG laser.

Copper hydroxide, copper hydroxide phosphate, copper phosphate, copper sulfate, copper thiocyanate, or any combination thereof. Unless otherwise indicated, these copper salts contain copper in the +2 oxidation state (cupric salts). Copper thiocyanate maybe present in either the +1 or +2 oxidation state.

A metal-organic complex (metal-ligand complex) comprising a metal selected from copper, silver, palladium, or any combination thereof. Suitable metal-organic complexes may include, for instance, metal monocarboxylate complexes, metal dicarboxylate complexes, metal acetylacetonate complexes, metal salicylaldiminato complexes, or the like. Particular examples of suitable metal-organic complexes may include, but are not limited to, copper carboxylates and dicarboxylates, such as copper oxalate and copper oleate; copper acetylacetonate; copper salen (salen=N,N'-bis(salicylidene)ethylenediamine); silver carboxylates, such as silver neodecanoate; and palladium carboxylates, such as palladium acetate and palladium neodecanoate. Palladium-containing metal-organic complexes may be converted to metal with a pulsed laser emitting in the ultraviolet region of the electromagnetic spectrum, such as with an excimer laser. Some silver-containing metal-organic complexes, in contrast, may be suitably converted to metal using a pulsed laser emitting in the visible region of the electromagnetic spectrum.

Particular examples of metal precursors suitable for use in the disclosure herein include, for example, PK3095 black pigment (Ferro Corporation) and Black 1G pigment black 28 (The Shepherd Color Company), both of which comprise copper chromate spinel.

The strength of absorption of infrared radiation, particularly in the near-infrared region of the electromagnetic spectrum, by the metal precursor may dictate whether irradiation with a pulsed laser results in sufficient conversion of the metal precursor into the corresponding metal. In the case of sufficiently strong absorption, the metal precursor may be adequate alone. If the strength of the infrared absorption is weaker, an infrared radiation absorber may also be admixed with the thermoplastic polymer to promote more efficient conversion of the metal precursor into metal. Suitable infrared radiation absorbers may include, but are not limited to, non-stoichiometric metal oxides containing a metal such as, for example, antimony, bismuth, boron, copper, indium, titanium, tin, cesium, zirconium, molybdenum, vanadium, iron, or any combination thereof. Specific examples of suitable infrared radiation absorbers may include, for example, antimony-doped tin oxide, antimony-doped indium tin oxide; reduced indium tin oxide, oxygen-deficient bismuth oxide, and any combination thereof. When present, nanoparticles used for promoting thermoplastic particulate formation, particularly oxide nanoparticles or carbon black, may constitute the infrared radiation absorber. That is, the infrared radiation absorber may be present in the plurality of nanoparticles used to facilitate formation of thermoplastic particulates or may constitute a separate material. When present, the infrared radiation absorber may be included in the thermoplastic particulates at a loading of about 0.01 wt. % to about 10 wt. % or about 0.5 wt. % to about 5 wt. % with respect to the thermoplastic polymer.

Depending on the infrared radiation absorption strength and whether an infrared radiation absorber is present, the metal precursor may comprise about 1 wt. % to about 25 wt. % of the plurality of thermoplastic particulates, as measured with respect to the thermoplastic polymer, or about 2 wt. % to about 30 wt. % of the plurality of thermoplastic particulates, or about 5 wt. % to about 15 wt. % of the plurality of thermoplastic particulates, as measured with respect to the thermoplastic polymer.

Examples of thermoplastic polymers suitable for use in the disclosure herein include, but are not limited to, polyamides (e.g., Nylon-6, Nylon-12, and the like), polyurethanes, polyethylenes, polypropylenes, polyacetals, polycarbonates, polyethylene terephthalates, polybutylene terephthalates, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyaryl ether ketones (PAEK), polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the present disclosure.

Particularly suitable examples of thermoplastic polymers for use in the disclosure herein may include polyamides, such as Nylon 6 or Nylon 12; acrylonitrile butadiene styrene; polylactic acid; polyurethanes; poly(arylene ether)s; polyaryletherketones; polycarbonates; polyimides; polyphenylene sulfides; poly(arylene sulfone)s; polyesters, such as polyethylene terephthalate or polybutylene terephthalate; and any combination thereof.

More specific examples of suitable polyamides include, but are not limited to, polycaproamide (Nylon 6, polyamide 6, or PA6), poly(hexamethylene succinamide) (Nylon 46, polyamide 46, or PA46), polyhexamethylene adipamide (Nylon 66, polyamide 66, or PA66), polypentamethylene adipamide (Nylon 56, polyamide 56, or PA56), polyhexamethylene sebacamide (Nylon 610, polyamide 610, or PA610), polyundecaamide (Nylon 11, polyamide 11, or PA11), polydodecaamide (Nylon 12, polyamide 12, or PA12), and polyhexamethylene terephthalamide (Nylon 6T, polyamide 6T, or PA6T), Nylon 10.10 (polyamide 10.10 or PA10.10), Nylon 10.12 (polyamide 10.12 or PA10.12), Nylon 10.14 (polyamide 10.14 or PA10.14), Nylon 10.18 (polyamide 10.18 or PA10.18), Nylon 6.10 (polyamide 6.10 or PA6.10), Nylon 6.18 (polyamide 6.18 or PA6.18), nylon 6.12 (polyamide 6.12 or PA6.12), Nylon 6.14 (polyamide 6.14 or PA6.14), semi-aromatic polyamide, and the like, and any combination thereof. Copolyamides may also be used. Examples of suitable copolyamides include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Polyesteramides, polyetheresteramides, polycarbonate-esteramides, and polyether-block-amides, which may be elastomeric, may also be used.

Examples of suitable polyurethanes include, but are not limited to, polyether polyurethanes, polyester polyurethanes, mixed polyether and polyester polyurethanes, the like, and any combination thereof. Examples of suitable polyurethanes include, but are not limited to, poly [4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Suitable thermoplastic polymers may be elastomeric or non-elastomeric. Some of the foregoing examples of thermoplastic polymers may be elastomeric or non-elastomeric depending on the specific composition of the polymer. For example, polyethylene that is a copolymer of ethylene and propylene may be elastomeric or not depending on the amount of propylene present in the polymer.

Elastomeric thermoplastic polymers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide), any of which may be used in the disclosure herein. Examples of elastomeric thermoplastic polymers can be found in Handbook of Thermoplastic Elastomers, 2nd ed., B. M. Walker and C. P. Rader, eds., Van Nostrand Reinhold, New York, 1988. Examples of elastomeric thermoplastic polymers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly (styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

In non-limiting examples, thermoplastic particulates of the disclosure herein may be formed through melt emulsification. Such methods for producing thermoplastic particulates may comprise combining a thermoplastic polymer and a metal precursor in a carrier fluid at a heating temperature at or above a melting point or softening temperature of the thermoplastic polymer; wherein the thermoplastic polymer and the carrier fluid are substantially immiscible at the heating temperature, and the metal precursor is activatable to form metal upon exposure to laser irradiation, such as a pulsed laser; applying sufficient shear to disperse the thermoplastic polymer as liquefied droplets in the presence of the metal precursor at the heating temperature; after liquefied droplets have formed, cooling the carrier fluid to at least a temperature at which thermoplastic particulates in a solidified state form, the thermoplastic particulates comprising the thermoplastic polymer and at least a portion of the metal precursor admixed with the thermoplastic polymer; and separating the thermoplastic particulates from the carrier fluid. More specific examples of such methods may comprise combining a thermoplastic polymer, nanoparticles, and a metal precursor in a carrier fluid at a heating temperature at or above a melting point or softening temperature of the thermoplastic polymer; wherein the thermoplastic polymer and the carrier fluid are substantially immiscible at the heating temperature, and the metal precursor is activatable to form metal upon exposure to laser irradiation, such as a pulsed laser; applying sufficient shear to disperse the thermoplastic polymer as liquefied droplets in the presence of the nanoparticles and the metal precursor at the heating temperature; after liquefied droplets have formed, cooling the carrier fluid to at least a temperature at which thermoplastic particulates in a solidified state form, the thermoplastic particulates comprising the thermoplastic polymer, at least a portion of the metal precursor admixed with the thermoplastic polymer, and at least a portion of the nanoparticles associated with an outer surface of each of the thermoplastic particulates; and separating the thermoplastic particulates from the carrier fluid. Optionally, an infrared radiation absorber may be combined with the thermoplastic polymer, the nanoparticles, and the metal precursor in the carrier fluid, such that the infrared radiation absorber is admixed with the thermoplastic particulates after formation thereof. Suitable examples of thermoplastic polymers, nanoparticles, metal precursors, and infrared radiation absorbers are provided hereinabove, any of which may be used for forming the thermoplastic particulates according to the disclosure herein.

Figure 1:
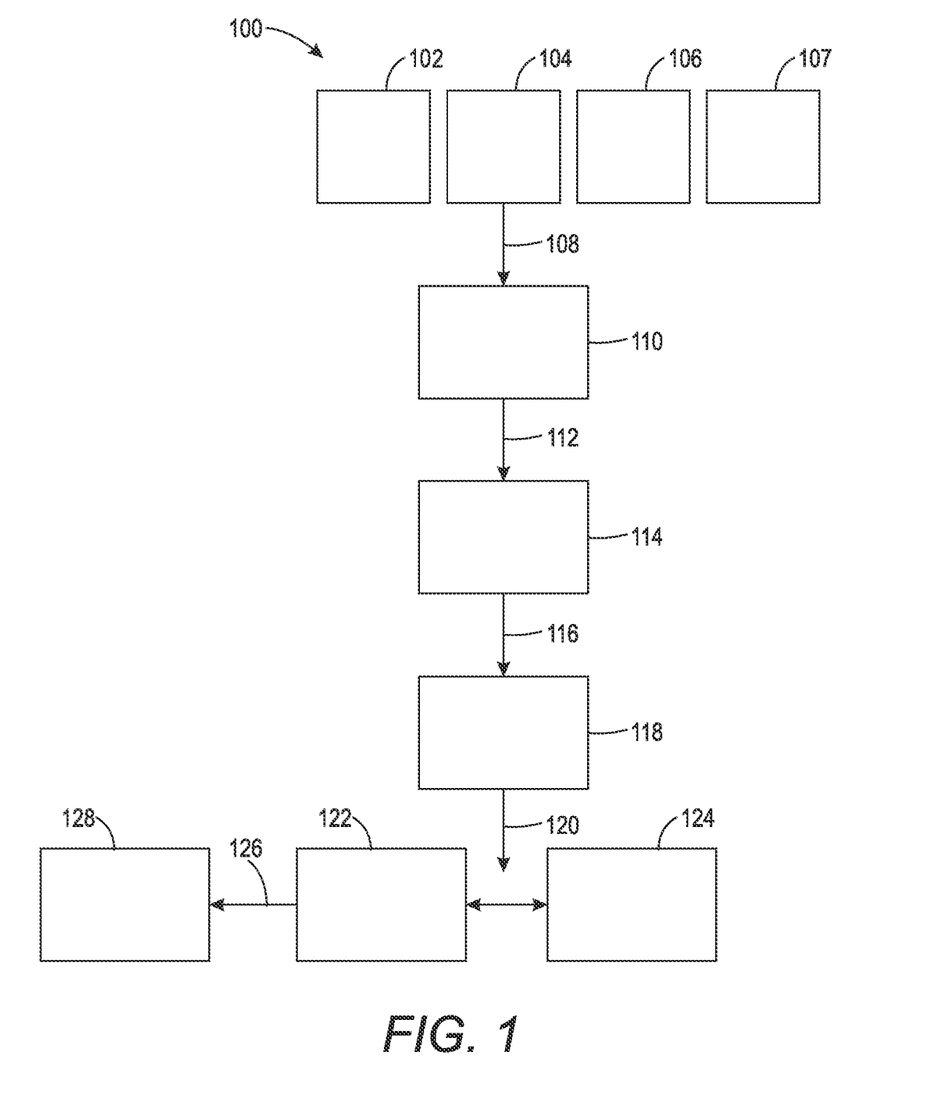
FIG. 1 is a flow chart of anon-limiting example method for producing thermoplastic particulates in accordance with the present disclosure.

FIG. 1 is a flow chart of non-limiting example method 100 for producing thermoplastic particulates in accordance with the present disclosure, wherein particulate formation takes place in the presence of nanoparticles. As shown, thermoplastic polymer 102, carrier fluid 104, nanoparticles 106, and metal precursor 107 are combined 108 to produce mixture 110. One or more surfactants, such as one or more sulfonate surfactants, may also be present in mixture 110. Thermoplastic polymer 102, carrier fluid 104, nanoparticles 106, and metal precursor 107 may be combined 108 in any order, with mixing and/or heating being conducted. In a particular example, carrier fluid 104 may be heated above a melting point or softening temperature of thermoplastic polymer 102 before combining the other components therewith.

Heating above the melting point or softening temperature of thermoplastic polymer 102 may be at any temperature below the decomposition temperature or boiling point of any of the components in the melt emulsion. In non-limiting examples, heating at a temperature about 1° C. to about 50° C., or about 1° C. to about 25° C., or about 5° C. to about 30° C., or about 20° C. to about 50° C. above the melting point or softening temperature of thermoplastic polymer 102 may be conducted. In the disclosure herein, melting points may be determined by ASTM E794-06(2018) with 10° C./min ramping and cooling rates. The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min. Melting points or softening temperatures in the present disclosure may range from about 50° C. to about 400° C.

Mixture 110 is then processed 112 by applying sufficient shear to produce liquefied droplets of thermoplastic polymer 102 at a temperature greater than the melting point or softening temperature of thermoplastic polymer 102, thereby forming melt emulsion 114. Without being limited by theory, it is believed that, all other factors being the same, increasing shear may decrease the size of the liquefied droplets in carrier fluid 104. It is to be understood that at some point there may be diminishing returns on increasing shear and decreasing the droplet size in turn and/or disruptions to the droplet contents at higher shear rates. Examples of mixing apparatuses suitable for producing melt emulsion 114 include, but are not limited to, extruders (e.g., continuous extruders, batch extruders and the like), stirred reactors, blenders, reactors with inline homogenizer systems, and the like, and apparatuses derived therefrom.

In non-limiting examples, the liquefied droplets may have a size of about 1 µm to about 1,000 µm, or about 1 µm to about 500 µm, or about 1 µm to about 200 µm, or about 1 µm to about 150 µm, or about 1 µm to about 130 µm, or about 1 µm to about 100 µm, or about 10 µm to about 150 µm, or about 10 µm to about 100 µm, or about 20 µm to about 80 µm, or about 20 µm to about 50 µm, or about 50 µm to about 90 µm. The resulting thermoplastic particulates formed after solidification may reside within similar size ranges. That is, the thermoplastic particulates in the particulate compositions and methods of the present disclosure may have a size of about 1 µm to about 1,000 µm, or about 1 µm to about 500 µm, or about 1 µm to about 200 µm, or about 1 µm to about 150 µm, or about 1 µm to about 130 µm, or about 1 µm to about 100 µm, or about 1 µm to about 200 µm, or about 10 µm to about 100 µm, or about 20 µm to about 80 µm, or about 20 µm to about 50 µm, or about 50 µm to about 90 µm. Particle size measurements may be made by analysis of optical images or using onboard software of a Malvern Mastersizer 3000 Aero S instrument, which uses light scattering techniques for particle size measurement.

For light scattering techniques, glass bead control samples with a diameter within the range of 15 µm to 150 µm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S. Particle sizes may be derived using the instrument software from a plot of volume density as a function of size.

Melt emulsion 114 is then cooled 116 to solidify the liquefied droplets into thermoplastic particulates in a solidified state. The cooling rate may range from about 100° C./sec to about 10° C./hour or about 10° C./sec to about 10° C./hr, including any cooling rate in between. Shear may be discontinued during cooling, or may be maintained at the same rate or a different rate during cooling. Cooled mixture 118 can then be treated 120 to isolate thermoplastic particulates 122 from other components 124 (e.g., carrier fluid 104, excess nanoparticles 106, excess metal precursor 107, and the like). Washing, filtering and/or the like may be conducted at this stage to purify thermoplastic particulates 122 further, wherein thermoplastic particulates 122 comprise thermoplastic polymer 102, at least a portion of nanoparticles 106 coating the outer surface of thermoplastic particulates 122, and at least a portion of metal precursor 107 being admixed or associated within thermoplastic particulates 122. Depending upon non-limiting factors such as the temperature (including cooling rate), the type of thermoplastic polymer 102, and the types and sizes of nanoparticles 106, nanoparticles 106 may become at least partially embedded within the outer surface of thermoplastic particulates 122 in the course of becoming disposed thereon. Even without embedment taking place, nanoparticles 106 may remain robustly associated with thermoplastic particulates 122 to facilitate their further use. Metal precursor 107 may be disposed upon the surface of thermoplastic particulates 122, admixed therewith as a solid in the polymer matrix, or dissolved within the polymer matrix.

In the foregoing, thermoplastic polymer 102 and carrier fluid 104 are chosen such that these components are immiscible or substantially immiscible (<5 wt. % solubility), particularly <1 wt. % solubility, at the various processing temperatures (e.g., from room temperature to the temperature at which liquefied droplets are formed and maintained as two or more phases).

After separating thermoplastic particulates 122 from other components 124, further processing 126 of thermoplastic particulates 122 may take place. In a non-limiting example further processing 126 may include, for example, sieving thermoplastic particulates 122 and/or blending thermoplastic particulates 122 with other substances to form processed thermoplastic particulates 128. Processed thermoplastic particulates 128 may be formulated for use in a desired application, such as additive manufacturing in a non-limiting example.

Figure 2:
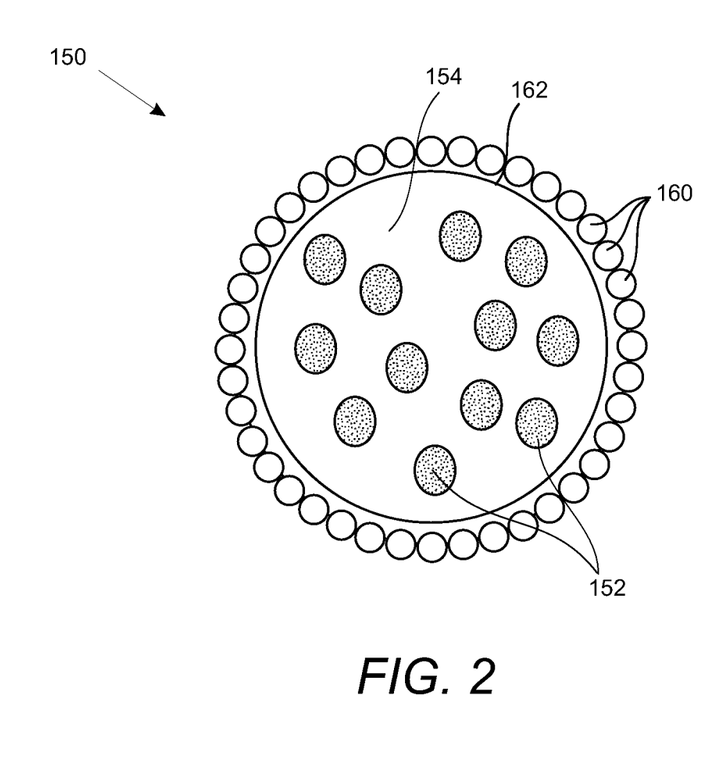
FIG. 2 is a diagram of a thermoplastic particulate containing a metal precursor admixed with a thermoplastic polymer and having a plurality of nanoparticles disposed upon an outer surface of the thermoplastic particulate.

FIG. 2 is a diagram of a thermoplastic particulate containing a metal precursor admixed with a thermoplastic polymer and having a plurality of nanoparticles disposed upon an outer surface of the thermoplastic particulate. As shown, thermoplastic particulate 150 contains metal precursor 152 admixed with the thermoplastic polymer within interior 154 of thermoplastic particulate 150. A plurality of nanoparticles 160 are also disposed upon outer surface 162 of thermoplastic particulate 150.

The thermoplastic particulates may have a bulk density of about 0.3 g/cm$^3$ to about 0.8 g/cm$^3$, or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$.

Shear sufficient to form liquefied droplets may be applied through stirring the carrier fluid in particular examples of the present disclosure. In non-limiting examples, the stirring rate may range from about 50 rotations per minute (RPM) to about 1500 RPM, or about 250 RPM to about 1000 RPM, or about 225 RPM to about 500 RPM. The stirring rate while melting the thermoplastic polymer may be the same as or different than the stirring rate used once liquefied droplets have formed. The liquefied droplets may be stirred over a stirring time of about 30 seconds to about 18 hours or longer, or about 1 minute to about 180 minutes, or about 1 minute to about 60 minutes, or about 5 minutes to about 6 minutes, or about 5 minutes to about 30 minutes, or about 10 minutes to about 30 minutes, or about 30 minutes to about 60 minutes.

Loading (concentration) of the thermoplastic polymer in the carrier fluid may vary over a wide range. In non-limiting examples, the loading of the thermoplastic polymer in the carrier fluid may range from about 1 wt. % to about 99 wt. % relative to the weight of the carrier fluid. In more particular examples, the loading of the thermoplastic polymer may range from about 5 wt. % to about 75 wt. %, or about 10 wt. % to about 60 wt. %, or about 20 wt. % to about 50 wt. %, or about 20 wt. % to about 30 wt. %, or about 30 wt. % to about 40 wt. %, or about 40 wt. % to about 50 wt. %, or about 50 wt. % to about 60 wt. %. The thermoplastic polymer may be present in an amount ranging from about 5 wt. % to about 60 wt. %, or about 5 wt. % to about 25 wt. %, or about 10 wt. % to about 30 wt. %, or about 20 wt. % to about 45 wt. %, or about 25 wt. % to about 50 wt. %, or about 40 wt. % to about 60 wt. % relative to a combined amount of the thermoplastic polymer and the carrier fluid.

Upon forming thermoplastic particulates in the presence of nanoparticles according to the disclosure herein, at least a portion of the nanoparticles, such as silica nanoparticles or other oxide nanoparticles, may be disposed as a coating or partial coating upon the outer surface of the thermoplastic particulates. The coating may be disposed substantially uniformly upon the outer surface. As used herein with respect to a coating, the term "substantially uniform" refers to even coating thickness in surface locations covered by the nanoparticles, particularly the entirety of the outer surface. Coating coverage upon the thermoplastic particulates may range from about 5% to about 100%, or about 5% to about 25%, or about 20% to about 50%, or about 40% to about 70%, or about 50% to about 80%, or about 60% to about 90%, or about 70% to about 100% of the surface area of the particulates. Coverage may be determined by image analysis of SEM micrographs.

Carrier fluids suitable for use in the disclosure herein include those in which the thermoplastic polymer is substantially immiscible with the carrier fluid, the carrier fluid has a boiling point exceeding the melting point or softening temperature of the thermoplastic polymer, and the carrier fluid has sufficient viscosity to form liquefied droplets of substantially spherical shape once the thermoplastic polymer has undergone melting therein. Suitable carrier fluids may include, for example, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof.

Suitable carrier fluids may have a density of about 0.6 g/cm$^3$ to about 1.5 g/cm$^3$, and the thermoplastic polymer may have a density of about 0.7 g/cm$^3$ to about 1.7 g/cm$^3$, wherein the thermoplastic polymer has a density similar to, lower than, or higher than the density of the carrier fluid.

Particularly suitable silicone oils are polysiloxanes. Illustrative silicone oils suitable for use in the disclosure herein include, for example, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like and any combination thereof.

In non-limiting examples, the carrier fluid and the thermoplastic polymer may be heated at a temperature of about 200° C. or above. Suitable heating temperatures may be chosen based upon the melting point or softening temperature of the thermoplastic polymer and the boiling point of the carrier fluid. The cooling rate following formation of liquefied polymer droplets may be varied as desired. In some instances, cooling may take place with heat dissipation to the surrounding environment taking place at an innate (uncontrolled) rate once heating is discontinued. In other cases, cooling at a controlled rate (e.g., by gradually decreasing the heating temperature and/or using jacketed temperature control to increase or decrease the rate of cooling may be employed.

Suitable carrier fluids, such as polysiloxanes, including PDMS, may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. The viscosity of the carrier fluid may be obtained from commercial suppliers or it may be measured, if desired, through techniques known to persons having ordinary skill in the art.

Separating the thermoplastic particulates from the carrier fluid may take place by any of a variety of known separation techniques. Any of gravity settling and filtration, decantation, centrifugation, or the like may be used to separate the thermoplastic particulates from the carrier fluid. The thermoplastic particulates may then be washed with a solvent in which the carrier fluid is soluble and the thermoplastic particulates are insoluble in the course of the separation process. In addition, a solvent in which the carrier fluid is soluble and the thermoplastic particulates are insoluble may be mixed with the carrier fluid and the thermoplastic particulates before initially separating the elastomeric particulates from the carrier fluid.

Suitable solvents for washing the thermoplastic particulates or mixing with the carrier fluid may include, but are not limited to, aromatic hydrocarbons (e.g., toluene and/or xylene), aliphatic hydrocarbons (e.g., heptane, n-hexane, and/or n-octane), cyclic hydrocarbons (e.g., cyclopentane, cyclohexane, and/or cyclooctane), ethers (e.g. diethyl ether, tetrahydrofuran, diisopropyl ether, and/or dioxane), halogenated hydrocarbons (e.g., dichloroethane, trichloroethane, dichloromethane, chloroform and/or carbon tetrachloride), alcohols (e.g., methanol, ethanol, isopropanol, and/or n-propanol), ketones (e.g., methyl ethyl ketone and/or acetone); esters (e.g., ethyl acetate and the like), water, the like, and any combination thereof. After washing the thermoplastic particulates, any of heating, vacuum drying, air drying, or any combination thereof may be performed.

At least a majority of the thermoplastic particulates obtained according to the disclosure here may be substantially spherical in shape. More typically, about 90% or greater, or about 95% or greater, or about 99% or greater of the thermoplastic particulates produced by melt emulsification according to the present disclosure may be substantially spherical in shape. In other non-limiting examples, the thermoplastic particulates of the present disclosure may have a sphericity (circularity) of about 0.9 or greater, including about 0.90 to about 1.0, or about 0.93 to about 0.99, or about 0.95 to about 0.99, or about 0.97 to about 0.99, or about 0.98 to 1.0. Sphericity (circularity) may be measured using a Sysmex FPIA-2100 Flow Particle Image Analyzer. To determine circularity, optical microscopy images are taken of the particulates. The perimeter (P) and area (A) of the particulates in the plane of the microscopy image is calculated (e.g., using a SYSMEX FPIA 3000 particle shape and particle size analyzer, available from Malvern Instruments). The circularity of the particulate is CEA/P, where CEA is the circumference of a circle having the area equivalent to the area (A) of the actual particulate.

The thermoplastic particulates of the present disclosure may have an angle of repose of about 25° to about 45°, or about 25° to about 35°, or about 30° to about 40°, or about 35° to about 45°. Angle of repose may be determined using a Hosokawa Micron Powder Characteristics Tester PT-R using ASTM D6393-14 "Standard Test Method for Bulk Solids" Characterized by Carr Indices."

Thermoplastic particulates isolated from the carrier fluid according to the disclosure above may be further processed to make the thermoplastic particulates suitable for an intended application. In one example, the thermoplastic particulates may be passed through a sieve or similar structure having an effective screening size that is greater than the average particle size of the thermoplastic particulates. For example, an illustrative screening size for processing thermoplastic particulates suitable for use in three-dimensional printing may have an effective screening size of about 150 μm. When referring to sieving, pore/screen sizes are described per U.S.A. Standard Sieve (ASTM E11-17). Other screening sizes, either larger or smaller, may be more suitable for thermoplastic particulates destined for use in other applications. Sieving may remove larger particulates that may have formed during the melt emulsification process and/or remove agglomerated particulates that may have poor flow characteristics. In general, sieves having an effective screening size ranging from about 10 μm to about 250 μm may be used.

In addition, the thermoplastic particulates, including sieved thermoplastic particulates, may be mixed with one or more additional components such as flow aids, fillers or other substances intended to tailor the properties of the thermoplastic particulates for an intended application. Mixing of the additional components with the thermoplastic particulates may be conducted by dry blending techniques. Suitable examples of flow aids (e.g., carbon black, graphite, silica, and the like) and similar substances will be familiar to one having ordinary skill in the art.

In particular applications, the particulate compositions disclosed herein may be utilized in additive manufacturing processes, especially those employing selective laser sintering or other powder bed fusion processes to promote particulate consolidation. Such printed objects obtained initially from selective laser sintering may feature the metal precursor remaining substantially unconverted to metal. Any metal precursor that does become activated during selective laser sintering is not thought to lead to production of coherent metal islands for forming one or more conductive traces. Subsequently, the metal precursor in the printed objects may be converted to metal (e.g., a plurality of discontinuous metal islands) in a desired pattern using laser irradiation, such as provided by a pulsed laser and described in more detail above. The metal islands may be subsequently interconnected by electroless plating to form one or more conductive traces upon the surface of the printed object.

Accordingly, additive manufacturing processes of the present disclosure may comprise: depositing in a powder bed a particulate composition comprising a plurality of thermoplastic particulates comprising a thermoplastic polymer and a metal precursor admixed with the thermoplastic polymer, in which the metal precursor is activatable to form metal islands upon exposure to laser irradiation, such as with a pulsed laser, and consolidating a portion of the plurality of thermoplastic particulates in the powder bed, such as through performing selective laser sintering, to form a printed object in which the metal precursor remains substantially unconverted to metal. In more specific examples, nanoparticles may be present upon the thermoplastic particulates, such that the additive manufacturing processes comprise depositing in a powder bed a particulate composition comprising a plurality of thermoplastic particulates comprising a thermoplastic polymer, a metal precursor admixed with the thermoplastic polymer, and a plurality of nanoparticles disposed upon an outer surface of each of the plurality of thermoplastic particulates, in which the metal precursor is activatable to form metal upon exposure to laser irradiation, such as with a pulsed laser, and consolidating a portion of the plurality of thermoplastic particulates in the powder bed, such as through performing selective laser sintering, to form a printed object in which the metal precursor remains substantially unconverted to metal. More specifically, printed objects produced in the foregoing manner may be formed by consolidating the thermoplastic particulates in the powder bed by exposure to a laser which does not substantially convert the metal precursor to metal or for which the conversion is very limited. Such printed objects may comprise a polymer matrix formed by particulate consolidation and comprising a thermoplastic polymer, and a metal precursor and, optionally, nanoparticles, admixed with the polymer matrix, wherein the metal precursor is activatable to form metal upon exposure to laser irradiation, such as with a pulsed laser.

Suitable conditions for performing selective laser sintering or other powder bed particulate consolidation processes to form the printed object are not believed to be especially limited, provided that the particulate consolidation does not also promote conversion of the metal precursor to metal. Lasers suitable for performing selective laser sintering in this manner may include both continuous wave lasers and pulsed wave lasers, either of which may provide the energy needed to promote consolidation of powder particulates. $CO_2$ lasers are commonly used to promote consolidation of polymeric powder particulates due to the high absorptivity of the polymers to the $CO_2$ laser emission wavelength. The operating conditions of the $CO_2$ laser may be chosen such that particulate consolidation occurs in preference to activation of the metal precursor. Standard laser settings for promoting consolidation of polymer particulates (e.g., power, scanning rate, bed temperature, and the like) may be selected based on the particular thermoplastic polymer that is present, and suitable laser settings may be chosen by one having ordinary skill in the art. The choice of particular conditions for conducting selective laser sintering or similar powder consolidation techniques may be influenced by non-limiting factors such as, for example, the type of thermoplastic polymer being used, the size and composition of the thermoplastic particulates, the type of printed object being produced, and the intended use conditions for the printed object.

Examples of printed objects formable using the particulate compositions disclosed herein are not considered to be particularly limited and may include, for example, containers (e.g., for food, beverages, cosmetics, personal care compositions, medicine, and the like), shoe soles, toys, furniture parts, decorative home goods, plastic gears, screws, nuts, bolts, cable ties, medical items, prosthetics, orthopedic implants, production of artifacts that aid learning in education, 3D anatomy models to aid in surgeries, robotics, biomedical devices (orthotics), home appliances, dentistry, automotive and airplane/aerospace parts, electronics, sporting goods, and the like. Many of these printed objects may benefit from the introduction of one or more conductive traces thereon, as discussed hereinafter.

After formation of a printed object containing a metal precursor in accordance with the disclosure herein, a portion of the metal precursor may be converted to metal islands, which may be subsequently converted to one or more metal traces. More specifically, methods of the present disclosure may comprise activating a portion of the metal precursor within the printed object using laser irradiation, particularly a pulsed laser, to form a plurality of discontinuous metal islands in a predetermined pattern upon a surface of the printed object. Suitable pulsed lasers may include, but are not limited to, Nd:YAG lasers, vanadate lasers, and fiber lasers. Other suitable lasers and conditions for promoting metal formation are specified above.

After forming discontinuous metal islands, the metal islands may be interconnected by performing electroless plating to form one or more conductive traces. The one or more conductive traces are electrically conductive and may be formed from a variety of suitable metals, such as copper, silver, gold or nickel. Multiple conductive traces may be separated from one another by about 150 µm or less in a non-limiting example. Suitable electroless plating conditions will be familiar to one having ordinary skill in the art and may be employed in the disclosure herein. Copper, for example, may be plated under electroless conditions using copper ethylenediaminetetraacetic acid complex (Cu-EDTA)/formaldehyde. In another particular example, copper-nickel alloys may be plated under electroless conditions using copper hypophosphate in the presence of nickel ions as a mediator. Nickel may be plated under electroless conditions using a nickel salt, such as nickel sulfate, for example, and a reducing agent such as hypophosphate or borohydride.

Figure 3:
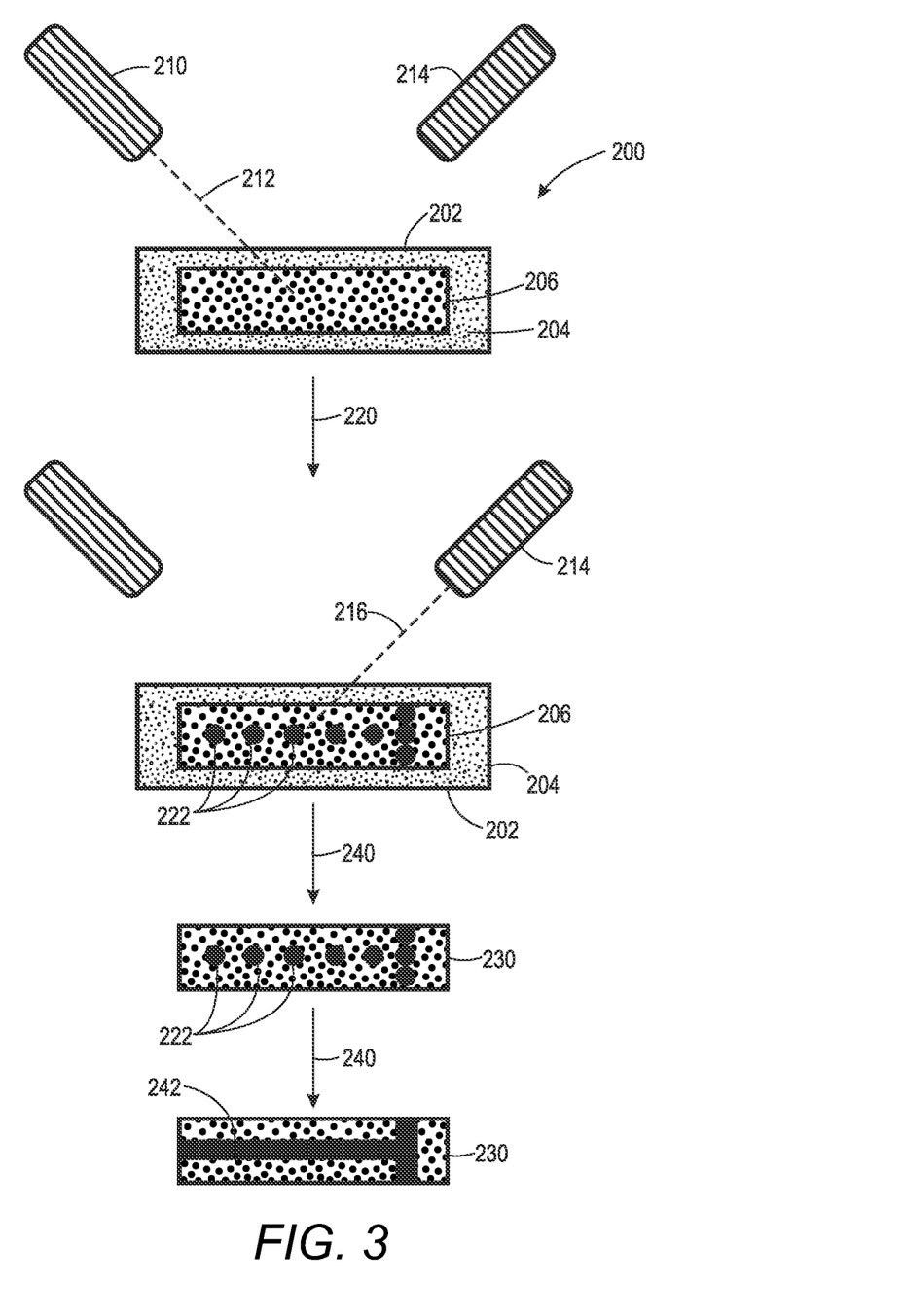
FIG. 3 is a diagram showing consolidation of thermoplastic particulates by selective laser sintering to form a printed object, followed by formation of metal islands using a pulsed laser.

FIG. 3 shows an illustrative process schematic demonstrating formation of a printed object by selective laser sintering, followed by activation of a metal precursor, as viewed from the top of the printed object. As shown, process 200 includes formation of powder bed 202, which includes unconsolidated thermoplastic particulates 204 and consolidated thermoplastic matrix 206, the latter of which is formed by laser irradiation 212 from laser 210, such as a $CO_2$ continuous laser. Laser 214 is a pulsed laser and differs from laser 210, such that laser 214 does not play a role in particulate consolidation to form consolidated thermoplastic matrix 206. In general, laser 214 is not activated during particulate consolidation. Although FIG. 3 has depicted lasers 210 and 214 being operated separately to promote particulate consolidation and metal island formation, it is also to be appreciated in light of the description above that a single laser may be utilized under different operating conditions to separately consolidate powder particulates and promote formation of metal islands.

In metal conversion 220, consolidated thermoplastic matrix 206 is selectively irradiated with pulsed laser beam 216 from laser 214 to define metal islands 222 in a desired pattern upon the surface of consolidated thermoplastic matrix 206. Thereafter, consolidated thermoplastic matrix 206 may be separated from unconsolidated thermoplastic particulates 204 to afford printed object 230 having metal islands 222 defined thereon. Alternately, printed object 230 may be freed from powder bed 202 before defining metal islands 222 thereon, in which case laser 214 may be located in a separate production line. Laser 214 may be a near-infrared pulsed laser in particular process configurations. Electroless plating 240 may then be performed to define conductive trace 242 in a desired pattern upon the surface of printed object 230.

Embodiments disclosed herein include:

A. Particulate compositions comprising powder particulates. The particulate compositions comprise: a plurality of thermoplastic particulates comprising a thermoplastic polymer and a metal precursor admixed with the thermoplastic polymer, the metal precursor being activatable to form metal islands upon exposure to laser irradiation.

B. Printed objects. The printed objects comprise: a polymer matrix formed by particulate consolidation and comprising a thermoplastic polymer; and a metal precursor admixed with the polymer matrix, the metal precursor being activatable to form metal islands upon exposure to laser irradiation.

C. Methods for forming a printed object by particulate consolidation. The methods comprise: depositing in a powder bed a particulate composition comprising a plurality of thermoplastic particulates comprising a thermoplastic polymer and a metal precursor admixed with the thermoplastic polymer, the metal precursor being activatable to form metal islands upon exposure to laser irradiation; and consolidating a portion of the plurality of thermoplastic particulates in the powder bed to form a printed object in which the metal precursor remains substantially unconverted to metal.

D. Methods for forming powder particulates. The methods comprise: combining a thermoplastic polymer and a metal precursor in a carrier fluid at a heating temperature at or above a melting point or softening temperature of the thermoplastic polymer; wherein the thermoplastic polymer and the carrier fluid are substantially immiscible at the heating temperature, and the metal precursor is activatable to form metal islands upon exposure to laser irradiation; applying sufficient shear to disperse the thermoplastic polymer as liquefied droplets in the presence of the metal precursor at the heating temperature; after liquefied droplets have formed, cooling the carrier fluid to at least a temperature at which thermoplastic particulates in a solidified state form, the thermoplastic particulates comprising the thermoplastic polymer and at least a portion of the metal precursor admixed with the thermoplastic polymer; and separating the thermoplastic particulates from the carrier fluid.

Each of embodiments A, B, C and D may have one or more of the following additional elements in any combination:

Element 1: wherein the particulate composition further comprises a plurality of nanoparticles disposed upon an outer surface of each of the plurality of thermoplastic particulates, the plurality of nanoparticles comprising a plurality of oxide nanoparticles, carbon black, or any combination thereof.

Element 1A: wherein the printed object further comprises a plurality of nanoparticles admixed with the polymer matrix, the plurality of nanoparticles comprising a plurality of oxide nanoparticles, carbon black, or any combination thereof.

Element 1B: wherein the plurality of thermoplastic particulates further comprise a plurality of nanoparticles disposed upon an outer surface of each of the plurality of thermoplastic particulates, the plurality of nanoparticles comprising a plurality of oxide nanoparticles, carbon black, or any combination thereof.

Element 1C: wherein the method further comprises combining nanoparticles with the thermoplastic polymer and the metal precursor in the carrier fluid, the plurality of nanoparticles comprising a plurality of oxide nanoparticles, carbon black, or any combination thereof; wherein at least a portion of the nanoparticles are disposed upon an outer surface of each of the thermoplastic particulates.

Element 2: wherein the plurality of oxide nanoparticles comprises a plurality of silica nanoparticles.

Element 3: wherein the metal precursor is thermally stable to a temperature greater than or equal to that of a melting point or softening temperature of the thermoplastic polymer.

Element 4: wherein the metal precursor is activatable by an infrared or near-infrared pulsed laser.

Element 5: wherein the metal precursor is activatable at a wavelength ranging from about 1020 nm to about 1070 nm.

Element 6: wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof; and any combination thereof.

Element 7: wherein the particulate composition further comprises an infrared radiation absorber admixed with the thermoplastic polymer.

Element 7A: wherein the printed object further comprises an infrared radiation absorber admixed with the polymer matrix.

Element 7B: wherein the plurality of thermoplastic particulates further comprises an infrared radiation absorber admixed with the thermoplastic polymer.

Element 7C: wherein the method further comprises combining an infrared radiation absorber in the carrier fluid, the infrared radiation absorber being admixed with the thermoplastic polymer in the thermoplastic particulates.

Element 8: wherein the infrared radiation absorber comprises a non-stoichiometric metal oxide.

Element 9: wherein the metal precursor is soluble in the thermoplastic polymer or is dispersed as particulates in the thermoplastic polymer, the particulates having a particle size ranging from about 10 nm to about 1000 nm.

Element 10: wherein the plurality of thermoplastic particulates comprise about 1 wt. % to about 25 wt. % of the metal precursor.

Element 10A: wherein the polymer matrix comprises about 1 wt. % to about 25 wt. % of the metal precursor.

Element 10B: wherein the plurality of thermoplastic particulates comprise about 1 wt. % to about 25 wt. % of the metal precursor.

Element 11: wherein the method further comprises activating a portion the metal precursor within the printed object using a pulsed laser to form a plurality of discontinuous metal islands in a predetermined pattern upon a surface of the printed object.

Element 12: wherein the method further comprises performing electroless plating to form one or more conductive traces interconnecting the plurality of discontinuous metal islands.

Element 13: wherein consolidating a portion of the plurality of thermoplastic particulates takes place by selective laser sintering.

Element 14: wherein the carrier fluid comprises a silicone oil.

Element 15: wherein the thermoplastic particulates have an average size ranging from about 1 µm to about 1000 µm in size, or about 10 µm to about 150 µm in size.

By way of non-limiting example, exemplary combinations applicable to A, B, C and D include, but are not limited to: 1, 1A, 1B, or 1C, and 2; 1, 1A, 1B, or 1C, and 4 or 5; 1, 1A, 1B, or 1C, and 6; 1, 1A, 1B, or 1C, and 7, 7A, 7B or 7C; 1, 1A, 1B, or 1C, and 10, 10A, or 10B; 1, 1A, 1B, or 1C, and 11; 1, 1A, 1B, or 1C, and 11 and 12; 1, 1A, 1B, or 1C, and 13; 1, 1A, 1B, or 1C, and 11 and 13; 1, 1A, 1B, or 1C, and 11-13; 4 or 5, and 6; 4 or 5, and 7, 7A, 7B or 7C; 4 or 5, and 10, 10A, or 10B; 4 or 5, and 11; 4 or 5, and 11 and 12; 4 or 5, and 13; 4 or 5, and 11 and 13; 4 or 5, and 11-13; 6 and 7, 7A, 7B or 7C; 6 and 10, 10A, or 10B; 6 and 11; 6, 11 and 12; 6 and 13; 6, 11 and 13; 6 and 11-13; 7, 7A, 7B or 7C, and 8; 7, 7A, 7B or 7C, and 10, 10A or 10B; 7, 7A, 7B or 7C, and 11; 7, 7A, 7B or 7C, and 11 and 12; 7, 7A, 7B or 7C, and 13; 7, 7A, 7B or 7C, and 11 and 13; 7, 7A, 7B or 7C, and 11-13; 10, 10A or 10B, and 11; 10, 10A or 10B, and 11 and 12; 10, 10A or 10B, and 13; 10, 10A or 10B, and 11 and 13; 10, 10A or 10B, and 11-13; 11 and 12; 11 and 13; 12 and 13; and 11-13. Any of elements 1-14 may be in combination with element 15, or element 15 may be in further combination with any of the foregoing combinations of elements 1-14.

Clauses of the Disclosure

Clause 1. A particulate composition comprising: a plurality of thermoplastic particulates comprising a thermoplastic polymer and a metal precursor admixed with the thermoplastic polymer, the metal precursor being activatable to form metal islands upon exposure to laser irradiation.

Clause 2. The particulate composition of clause 1, further comprising:

a plurality of nanoparticles disposed upon an outer surface of each of the plurality of thermoplastic particulates, the plurality of nanoparticles comprising a plurality of oxide nanoparticles, carbon black, or any combination thereof.

Clause 3. The particulate composition of clause 2, wherein the plurality of oxide nanoparticles comprises a plurality of silica nanoparticles.

Clause 4. The particulate composition clause 1, wherein the metal precursor is thermally stable to a temperature greater than or equal to that of a melting point or softening temperature of the thermoplastic polymer.

Clause 5. The particulate composition of clause 1, wherein the metal precursor is activatable by an infrared or near-infrared pulsed laser.

Clause 6. The particulate composition of clause 1, wherein the metal precursor is activatable at a wavelength ranging from about 1020 nm to about 1070 nm.

Clause 7. The particulate composition of clause 1, wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof; and any combination thereof.

Clause 8. The particulate composition of clause 1, further comprising:
an infrared radiation absorber admixed with the thermoplastic polymer.

Clause 9. The particulate composition of clause 8, wherein the infrared radiation absorber comprises a non-stoichiometric metal oxide.

Clause 10. The particulate composition of clause 1, wherein the metal precursor is soluble in the thermoplastic polymer or is dispersed as particulates in the thermoplastic polymer, the particulates having a particle size ranging from about 10 nm to about 1000 nm.

Clause 11. The particulate composition of clause 1, wherein the plurality of thermoplastic particulates comprise about 1 wt. % to about 25 wt. % of the metal precursor.

Clause 12. The particulate composition of clause 1, wherein the thermoplastic particulates have an average size (D50) ranging from about 1 µm to about 1000 µm.

Clause 13. A printed object comprising:
a polymer matrix formed by particulate consolidation and comprising a thermoplastic polymer; and
a metal precursor admixed with the polymer matrix, the metal precursor being activatable to form metal islands upon exposure to laser irradiation.

Clause 14. The printed object of clause 13, further comprising:
a plurality of nanoparticles admixed with the polymer matrix, the plurality of nanoparticles comprising a plurality of oxide nanoparticles, carbon black, or any combination thereof.

Clause 15. The printed object of clause 14, wherein the plurality of oxide nanoparticles comprises a plurality of silica nanoparticles.

Clause 16. The printed object of clause 13, wherein the metal precursor is thermally stable to a temperature greater than or equal to that of a melting point or softening temperature of the thermoplastic polymer.

Clause 17. The printed object of clause 13, wherein the metal precursor is activatable by an infrared or near-infrared pulsed laser.

Clause 18. The printed object of clause 13, wherein the metal precursor is activatable at a wavelength ranging from about 1020 nm to about 1070 nm.

Clause 19. The printed object of clause 13, wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof; and any combination thereof.

Clause 20. The printed object of clause 13, further comprising:
an infrared radiation absorber admixed with the polymer matrix.

Clause 21. The printed object of clause 20, wherein the infrared radiation absorber comprises a non-stoichiometric metal oxide.

Clause 22. The printed object of clause 13, wherein the metal precursor is soluble in the polymer matrix or is dispersed as particulates in the polymer matrix, the particulates having a particle size ranging from about 10 nm to about 1000 nm.

Clause 23. The printed object of clause 13, wherein the polymer matrix comprises about 1 wt. % to about 25 wt. % of the metal precursor.

Clause 24. A method comprising:
depositing in a powder bed a particulate composition comprising a plurality of thermoplastic particulates comprising a thermoplastic polymer and a metal precursor admixed with the thermoplastic polymer, the metal precursor being activatable to form metal islands upon exposure to laser irradiation; and
consolidating a portion of the plurality of thermoplastic particulates in the powder bed to form a printed object in which the metal precursor remains substantially unconverted to metal.

Clause 25. The method of clause 24, wherein the plurality of thermoplastic particulates further comprise a plurality of nanoparticles disposed upon an outer surface of each of the plurality of thermoplastic particulates, the plurality of nanoparticles comprising a plurality of oxide nanoparticles, carbon black, or any combination thereof.

Clause 26. The method of clause 25, wherein the plurality of oxide nanoparticles comprises a plurality of silica nanoparticles.

Clause 27. The method of clause 24, wherein the metal precursor is thermally stable to a temperature greater than or equal that of to a melting point or softening temperature of the thermoplastic polymer.

Clause 28. The method of clause 24, wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof and any combination thereof.

Clause 29. The method of clause 24, wherein the plurality of thermoplastic particulates further comprises an infrared radiation absorber admixed with the thermoplastic polymer.

Clause 30. The method of clause 29, wherein the infrared radiation absorber comprises a non-stoichiometric metal oxide.

Clause 31. The method of clause 24, wherein the metal precursor is soluble in the thermoplastic polymer or is dispersed as particulates in the thermoplastic polymer, the particulates having a particle size ranging from about 10 nm to about 1000 nm.

Clause 32. The method of clause 24, wherein the plurality of thermoplastic particulates comprise about 1 wt. % to about 25 wt. % of the metal precursor.

Clause 33. The method of clause 24, wherein the metal precursor is activatable with an infrared or near-infrared pulsed laser.

Clause 34. The method of clause 24, wherein the metal precursor is activatable at a wavelength ranging from about 1020 nm to about 1070 nm.

Clause 35. The method of clause 24, further comprising:
activating a portion the metal precursor within the printed object using a pulsed laser to form a plurality of discontinuous metal islands in a predetermined pattern upon a surface of the printed object.

Clause 36. The method of clause 35, further comprising:
performing electroless plating to form one or more conductive traces interconnecting the plurality of discontinuous metal islands.

Clause 37. The method of clause 24, wherein consolidating a portion of the plurality of thermoplastic particulates takes place by selective laser sintering.

Clause 38. The method of clause 24, wherein the thermoplastic particulates have an average size (D50) ranging from about 1 µm to about 1000 µm.

Clause 39. A method comprising:
combining a thermoplastic polymer and a metal precursor in a carrier fluid at a heating temperature at or above a melting point or softening temperature of the thermoplastic polymer;
wherein the thermoplastic polymer and the carrier fluid are substantially immiscible at the heating temperature, and the metal precursor is activatable to form metal islands upon exposure to laser irradiation;
applying sufficient shear to disperse the thermoplastic polymer as liquefied droplets in the presence of the metal precursor at the heating temperature;
after liquefied droplets have formed, cooling the carrier fluid to at least a temperature at which thermoplastic particulates in a solidified state form, the thermoplastic particulates comprising the thermoplastic polymer and at least a portion of the metal precursor admixed with the thermoplastic polymer; and
separating the thermoplastic particulates from the carrier fluid.

Clause 40. The method of clause 39, further comprising:
combining nanoparticles with the thermoplastic polymer and the metal precursor in the carrier fluid, the plurality of nanoparticles comprising a plurality of oxide nanoparticles, carbon black, or any combination thereof
wherein at least a portion of the nanoparticles are disposed upon an outer surface of each of the thermoplastic particulates.

Clause 41. The method of clause 40, wherein the plurality of oxide nanoparticles comprises a plurality of silica nanoparticles.

Clause 42. The method of clause 39, wherein the metal precursor is thermally stable to a temperature greater than or equal to that of the melting point or softening temperature.

Clause 43. The method of clause 39, wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof and any combination thereof.

Clause 44. The method of clause 39, further comprising:
combining an infrared radiation absorber in the carrier fluid, the infrared radiation absorber being admixed with the thermoplastic polymer in the thermoplastic particulates.

Clause 45. The method of clause 44, wherein the infrared radiation absorber comprises a non-stoichiometric metal oxide.

Clause 46. The method of clause 39, wherein the metal precursor is soluble in the thermoplastic polymer or is dispersed as particulates in the thermoplastic polymer, the particulates having a particle size ranging from about 10 nm to about 1000 nm.

Clause 47. The method of clause 39, wherein the thermoplastic particulates comprise about 1 wt. % to about 25 wt. % of the metal precursor.

Clause 48. The method of clause 39, wherein the metal precursor is activatable by an infrared or near-infrared pulsed laser.

Clause 49. The method of clause 39, wherein the metal precursor is activatable at a wavelength ranging from about 1020 nm to about 1070 nm.

Clause 50. The method of clause 39, wherein the carrier fluid comprises a silicone oil.

Clause 51. The method of clause 39, wherein the thermoplastic particulates have an average size ($D_{50}$) ranging from about 1 µm to about 1000 µm.

To facilitate a better understanding of the present disclosure, the following examples of preferred or representative embodiments are given. In no way should the following examples be read to limit, or to define, the scope of the invention.

Examples

A 1 L glass kettle reactor was loaded with 400 g 10k polydimethylsiloxane (PDMS) oil, 120 g of polyamide 12 containing 5 wt. % copper chromite spinel, and 0.4 g R812S silica having a hydrophobically modified surface (average particle size=7 nm and BET surface=260±30 m$^2$/g, Evonik). The resulting mixture was heated at 230° C. for 30 minutes with stirring at 260 RPM, followed by an additional 40 minutes of stirring at 1250 rpm. Thereafter, heating and stirring were discontinued, and the slurry was allowed to cool to room temperature. The resulting particulates were separated from the silicone oil and washed three times with heptane to remove the residual silicone oil. The particulates were then air dried in a fume hood to afford particulates having a size ranging from about 50 microns to about 100 microns.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A particulate composition comprising: a plurality of thermoplastic particulates each having an outer surface and an interior, the thermoplastic particulates comprising a metal precursor admixed with a thermoplastic polymer within the interior of the thermoplastic particulates, a plurality of nanoparticles disposed upon the outer surface of the thermoplastic particulates, the plurality of nanoparticles being in contact with the thermoplastic polymer at the outer surface and comprising a plurality of silica nanoparticles, carbon black, or combination thereof,
the metal precursor being activatable to form metal islands upon exposure to laser irradiation.

2. The particulate composition of claim 1, wherein the metal precursor is activatable by an infrared or near-infrared pulsed laser.

3. The particulate composition of claim 1, wherein the metal precursor is activatable at a wavelength ranging from about 1020 nm to about 1070 nm.

4. The particulate composition of claim 1, wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof; and any combination thereof.

5. The particulate composition of claim 1, further comprising:
an infrared radiation absorber admixed with the thermoplastic polymer;
wherein the infrared radiation absorber comprises a non-stoichiometric metal oxide containing a metal selected from the group consisting of antimony, bismuth, boron, indium, titanium, tin, cesium, zirconium, molybdenum, vanadium, iron, and any combination thereof.

6. A method comprising: depositing in a powder bed a particulate composition comprising a plurality of thermoplastic particulates each having an outer surface and an interior, the thermoplastic particulates comprising a metal precursor admixed with a thermoplastic polymer within the interior of the thermoplastic particulates, wherein the plurality of thermoplastic particulates further comprise a plurality of nanoparticles disposed upon the outer surface of the thermoplastic particulates, the plurality of nanoparticles being in contact with the thermoplastic polymer at the outer surface and comprising a plurality of silica oxide nanoparticles, carbon black, or any combination thereof;
the metal precursor being activatable to form metal islands upon exposure to laser irradiation; and consolidating a portion of the plurality of thermoplastic particulates in the powder bed to form a printed object in which the metal precursor remains substantially unconverted to metal.

7. The method of claim 6, wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof; and any combination thereof.

8. The method of claim 6, wherein the metal precursor is activatable with an infrared or near-infrared pulsed laser.

9. The method of claim 6, further comprising:
activating a portion the metal precursor within the printed object using a pulsed laser to form a plurality of discontinuous metal islands in a predetermined pattern upon a surface of the printed object.

10. The method of claim 9, further comprising:
performing electroless plating to form one or more conductive traces interconnecting the plurality of discontinuous metal islands.

11. The particulate composition of claim 1, wherein the metal precursor is dispersed as metal precursor particulates in the thermoplastic polymer, the metal precursor particulates having a particle size ranging from about 10 nm to about 1000 nm.

* * * * *